United States Patent
Leung et al.

(10) Patent No.: US 6,625,593 B1
(45) Date of Patent: Sep. 23, 2003

(54) PARALLEL QUERY OPTIMIZATION STRATEGIES FOR REPLICATED AND PARTITIONED TABLES

(75) Inventors: Ting Yu Leung, San Jose, CA (US); Mir Hamid Pirahesh, San Jose, CA (US); David E. Simmen, San Jose, CA (US); Tuong Chanh Truong, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/395,771

(22) Filed: Sep. 13, 1999

Related U.S. Application Data

(63) Continuation-in-part of application No. 09/106,473, filed on Jun. 29, 1998, now Pat. No. 6,112,198.
(60) Provisional application No. 60/100,149, filed on Sep. 14, 1998.

(51) Int. Cl.[7] ............................................. G06F 17/30
(52) U.S. Cl. ............................................. 707/2; 707/4
(58) Field of Search ................................ 707/2, 3, 4, 5, 707/10, 100, 102, 104, 201; 709/104

(56) References Cited

U.S. PATENT DOCUMENTS

| | | | |
|---|---|---|---|
| 5,574,900 A | 11/1996 | Huang et al. | 707/1 |
| 5,692,174 A | 11/1997 | Bireley et al. | 707/3 |
| 5,758,337 A | 5/1998 | Hammond | 707/6 |
| 5,797,000 A | 8/1998 | Bhattacharya et al. | 707/2 |
| 5,857,180 A | 1/1999 | Hallmark et al. | 707/2 |
| 6,112,198 A * | 8/2000 | Lohman et al. | 707/3 |
| 6,289,334 B1 * | 9/2001 | Reiner et al. | 707/3 |

OTHER PUBLICATIONS (Abstract) Wen Fang Wang et al., "A New Relation Partitioning Scheme for Distributed Query Optimization", *Journal of Information Science and Eng.*, V12, N1, pp 79–99, Mar. 1996.

* cited by examiner

Primary Examiner—Diane D. Mizrahi
Assistant Examiner—Apru Mofiz
(74) Attorney, Agent, or Firm—Gates & Cooper LLP

(57) ABSTRACT

A method, apparatus, and article of manufacture for optimizing database queries. The query is analyzed to determine whether at least a portion of the query can be evaluated using a plurality of parallel operations without data redistribution. If so, then the most efficient query execution plan that uses these parallel operations is constructed and executed.

108 Claims, 3 Drawing Sheets

PARALLEL QUERY OPTIMIZATION STRATEGIES FOR REPLICATED AND PARTITIONED TABLES

CROSS-REFERENCE TO RELATED APPLICATION

This application is a continuation-in-part under 35 U.S.C. §120 of and commonly-assigned Ser. No. 09/106,473 filed Jun. 29, 1998, now U.S. Pat. No. 6,112,198, issued Aug. 29, 2000, to Lohman et al, and entitled OPTIMIZATION OF DATA REPARTITIONING DURING PARALLEL QUERY OPTIMIZATION.

This application claims the benefit under 35 U.S.C. §119(e) of co-pending and commonly-assigned U.S. Provisional application serial No. 60/100,149, filed on Sep. 14, 1998, by Ting Y. Leung, Mir H. Pirahesh, David E. Simmens, and Tuong C. Troung, entitled "PARALLEL QUERY OPTIMIZATION STRATEGIES FOR REPLICATED TABLES,", which application is incorporated by reference herein.

BACKGROUND OF THE INVENTION

1. Field of the Invention.

This invention relates in general to database management systems performed by computers, and in particular, to the optimization of queries by parallel execution using replicated and partitioned tables.

2. Description of Related Art.

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Institute (ANSI) and the International Standards Organization (ISO).

Achieving interactive response time for data and/or logic intensive queries in decision support, on-line analytical processing, and data mining applications of an RDBMS is a key challenge for commercial database management systems. Parallel query execution is the best hope for achieving this goal.

One method of achieving parallel query execution is through the exploitation of database replication and partitioning. The replicated portions or partitions of the database are known as distributions. Using these techniques, queries can be deconstructed into subtasks based upon the replication and/or partitioning of the database. These subtasks are executed by parallel instances of the RDBMS, wherein each subtask is executed by an instance that manages a distribution of the database. Typically, the results of these subtasks are merged for delivery to a requesting application.

Optimization choices regarding how queries are deconstructed into subtasks are determined by the distributions of the database. Often, the database has to be replicated or partitioned dynamically to satisfy the requirements of a given query operation. Such dynamic replication or partitioning is an expensive operation and should be optimized or avoided altogether.

There is a need in the art for general query optimization strategies that take into account prior replication or partitioning as a general distribution property of database tables and derived tables. Specifically, there is a need in the art for techniques that determine when parallel RDBMS operations can be carried out without data movement based on prior data movements.

SUMMARY OF THE INVENTION

To overcome the limitations in the prior art described above, and to overcome other limitations that will become apparent upon reading and understanding the present specification, the present invention discloses a method, apparatus, and article of manufacture for optimizing database queries. The query is analyzed to determine whether at least a portion of the query can be evaluated using a plurality of parallel operations without data redistribution. If so, then the most efficient query execution plan that uses these parallel operations is generated and executed.

Thus, it is an object of the present invention to take advantage of data that was previously replicated or partitioned across a plurality of nodes in the computer system. The data may have been distributed when a table was created, or redistributed as a result of an dynamic operation.

In addition, it is an object of the present invention to analyze a query by taking into account a distribution property of a data stream for an operation of the query. The distribution property describes a set of nodes that may contain tuples of the data stream, a distribution function used for assigning the tuples to nodes, and a distribution key to which the distribution function is applied.

It is also an object of the present invention to add an operator to a query execution plan (QEP) to dynamically change the distribution properties of the data streams in response to distribution requirements of operations within the QEP.

Another object of the present invention is to generate efficient QEPs for parallel execution by having basic operators understand how to handle input streams with replicated or partitioned distributions. This requires that the basic operators understand when their operations can be performed locally. It also requires that the basic operators compute the distribution property of the stream produced by their operations.

It is yet another object of the present invention to provide specific optimization techniques for joins, aggregations, subquery evaluations, set operations, error checking scalar subselects, and table function access.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention provides general query optimization strategies that take into account replication and partitioning as a general distribution property of database tables and derived tables. The present invention determines when operations can be performed in parallel without data movement when data has been replicated or partitioned beforehand. This may have occurred when the table was created or as a result of a previously-executed operation that dynamically replicated or partitioned an intermediate result.

Hardware Environment

Figure 1:
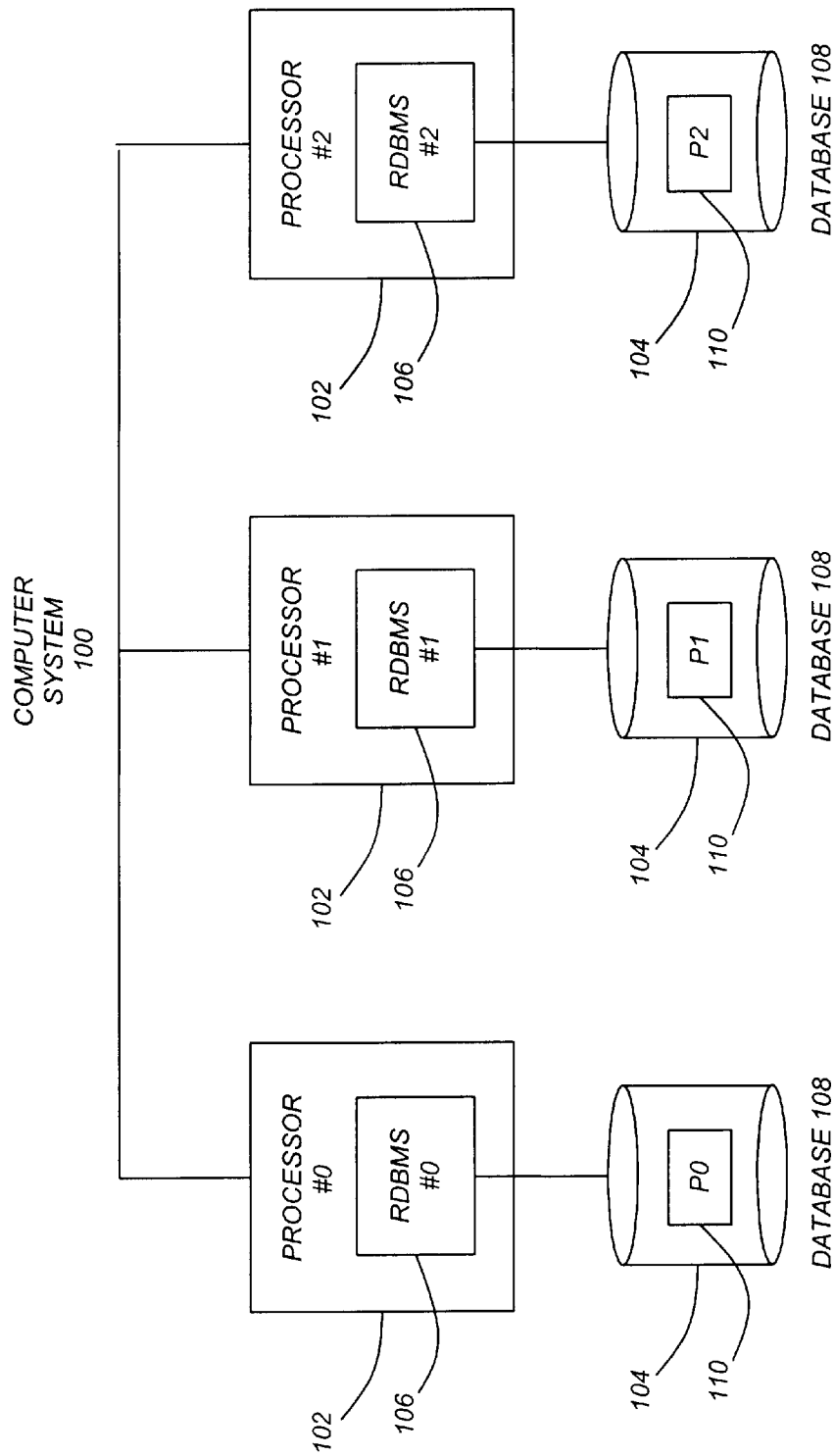
FIG. 1 illustrates an exemplary computer hardware environment that could be used with the preferred embodiment of the present invention.

FIG. 1 illustrates an exemplary computer hardware environment that could be used with the preferred embodiment of the present invention. In the exemplary environment, a massively parallel processing (MPP) computer system 100 is comprised of a plurality of interconnected processors 102, each of which is connected to one or more data storage devices 104, such as disk drives.

In the preferred embodiment, a relational database management system (RDBMS) is configured for a shared-nothing parallel (SNP) architecture, so that functions are divided among the processors 102 in the computer system 100, and thus the RDBMS is comprised of a collection of instances or threads called nodes 106. Each node 106 has its own RDBMS resources, such as tables, indexes, buffer pools, logs, locks, etc.

The tables of a relational database 108 are either horizontally or vertically partitioned or replicated across the nodes 106. The replica or partition 110 of a table managed by a given node 106 is called a distribution. All access to a distribution is through the node 106 managing the distribution. Parallelism of RDBMS 106 operations is achieved by dividing the work among nodes 106 managing the distributions of relevant tables. The nodes 106 coordinate the work using standard interprocess communication protocols.

Generally, the RDBMS 106 comprises logic and/or data that is embodied in or retrievable from a device, medium, or carrier, e.g., a data storage device 104, a remote device coupled to the computer system 100 by a data communications device, etc. Moreover, this logic and/or data, when read, executed, and/or interpreted by the computer system 100, cause the computer system 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic and/or data accessible from any device, carrier, or media.

Of course, those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

PARTITIONING AND REPLICATION

As noted above, parallelism is frequently achieved by partitioning tables in a database 108 among nodes 106. Queries can then be deconstructed into subtasks based upon the partitioning of the database 108, wherein these subtasks are executed by the nodes 106 managing the partition 110 and the results of subtasks are merged for delivery to a requesting application.

Optimization choices regarding how queries are broken into subtasks are driven by how the data is partitioned. Often, data has to be repartitioned dynamically to satisfy the partitioning requirements of a given query operation. On the other hand, repartitioning is an expensive operation and should be optimized or avoided altogether. One important technique for avoiding redistribution is to equivalently partition tables that are joined in a query.

As an example, consider the following queries:
Query 1:
SELECT*
FROM A, B
WHERE A.X=B.X
Query 2:
SELECT*
FROM A, C
WHERE A.Y=C.X Assume that tables A, B, and C are partitioned over the same nodes 106 using the same deterministic partitioning function applied to their respective partitioning columns A.X, B.X, and C.X. The join of Query 1 can be performed in parallel without any data movement, or locally. This is illustrated below:

| Node #0 | | |
|---------|---------|---------|
| A0(X,Y) | B0(X,Y) | C0(X,Y) |
| 1,1 | 1,1 | 1,1 |
| 1,2 | 1,2 | 1,2 |
| 1,3 | 1,3 | 1,3 |
| Node #1 | | |
| A1(X,Y) | B1(X,Y) | C1(X,Y) |
| 2,1 | 2,1 | 2,1 |
| 2,2 | 2,2 | 2,2 |
| 2,3 | 2,3 | 2,3 |

In the above example, A, B, and C are partitioned over two nodes 106 using the partitioning column X.

As shown, no data movement is required to execute the join, because the rows of A and B that satisfy the join predicate A.X=B.X are assigned to the same nodes 106. Parallel execution in this example is achieved by having a coordinator node 106 distribute similar subtasks for joining A and B to node #0 and node #1. Node #0 and node #1 performs their joins a synchronously and then return resulting rows back to the coordinator node 106.

However, the join in Query 2 cannot be performed locally since A is not partitioned on the join attribute Y. Consequently, it is possible that there are values satisfying the predicate A.Y=C.X on more than one node 106 since A is partitioned using partitioning column A.X.

As the example shows, the initial distribution of a table may satisfy the distribution requirements required to localize a join operation in one query, while not necessarily satisfying the distribution requirements required to localize a join in another query. One technique used to solve this problem is to replicate the data of a table rather than partition it.

Consider the previous example again; however, this time assume that table A is now replicated over the same set of nodes 106, while tables B and C remain partitioned over the same nodes 106 using the same deterministic partitioning function applied to their respective partitioning columns B.X and C.X. This is illustrated below:

|  | Node #0 |  |
|---|---|---|
| A0(X,Y) | B0(X,Y) | C0(X,Y) |
| 1,1 | 1,1 | 1,1 |
| 1,2 | 1,2 | 1,2 |
| 1,3 | 1,3 | 1,3 |
| 2,1 |  |  |
| 2,2 |  |  |
| 2,3 |  |  |

|  | Node #1 |  |
|---|---|---|
| A1(X,Y) | B1(X,Y) | C1(X,Y) |
| 1,1 | 2,1 | 2,1 |
| 1,2 | 2,2 | 2,2 |
| 1,3 | 2,3 | 2,3 |
| 2,1 |  |  |
| 2,2 |  |  |
| 2,3 |  |  |

In the above example, A is replicated over two nodes 106 (#0 and #1), and B and C are partitioned over the same two nodes 106 using the partitioning column x.

Now, both queries can be performed locally since every value of A.X and A.Y is available to all nodes 106 of B and all nodes 106 of C. Note that replicating table C also localizes the join operation for Query 2. The effect of replication in localizing a join is symmetric.

Replication to Localize a Join with a Partitioned Table

The examples provided above show that replication can localize a parallel join when one table is partitioned and another table is replicated. The criteria for locality is that the replicated table be distributed on nodes 106 which are a superset of the nodes 106 of the partitioned table. Parallel join operations take place on the intersection of the two sets of nodes 106.

Replication to Localize Subquery Operations

Replication can be detected to localize subquery predicate application as well. The distribution requirements for localizing subquery predicate application are similar to the requirements for localizing a join operation. The subquery result table and the table applying the subquery predicate must be equivalently partitioned with respect to the predicates referencing columns of both tables.

Consider the following example:
SELECT*
FROM C
WHERE EXISTS (SELECT A.X
   FROM A
   WHERE C.X=A.Y)

Assume again that tables A and C are partitioned over the same nodes 106 using the same deterministic partitioning function applied to their respective partitioning columns A.X and C.X. Given this partitioning, the EXISTS subquery predicate cannot be applied locally because the tables are not equivalently partitioned with respect to the predicate C.X=A.Y. As in the join example above, replicating table A will localize subquery predicate application.

Although the example shows the subquery predicate as a simple conjunct, the subquery predicate can be part of any general Boolean expression. Note that unlike the join operation the effect of replication in localizing the subquery predicate application is not symmetric. Replicating table C does not localize the subquery.

Replication to Localize Aggregation Operations

The requirements for localizing a group by, or distinct operation, or aggregation operation, over a partitioned table requires that the partitioning columns of a table are a subset of the aggregation columns. If this requirement is satisfied, all common values will be found on one node 106; otherwise, repartitioning must occur to complete aggregation.

Consider the following example using the same partitioning for tables A and C as in the prior examples:
SELECT*
FROM C
WHERE C.Y IN (SELECT AVG(A.X)
   FROM A
   GROUP BY A.Y)

Since A is partitioned using column A.X, there is no guarantee that each node 106 has duplicate Y values. Although some aggregation, or partial aggregation can be performed on each node 106, a final aggregation step must be performed after first repartitioning on some subset of the grouping columns (in this case A.Y). Note that subquery predicate application cannot be performed locally either. However, if table A is replicated both aggregation and subquery predicate application can be performed locally.

Replication to Localize Error Checking for Scalar Subqueries

A scalar subquery is one whose result table contains a single value. The following query contains a scalar subquery:
Query 1:
SELECT*
FROM C
WHERE B.X=(SELECT A.X
   FROM A
   WERE A.Y≦3)

If A.Y is not declared as a column with unique values, then the system must issue an error if the subquery result returns more than one row satisfying A.Y=3. If table A is partitioned, then local error checking can occur on each partition; however, if no error is detected, a global error checking step must occur since multiple nodes 106 may return a row satisfying the predicate A.Y=3. Global error checking requires that each node 106 send its results to a single node 106. Note that if A were replicated, then no global error checking step would be required.

Localizing Operations Involving Replicable Table Functions

A query may reference a table function anywhere a reference to a database 108 table is permitted. A table function is a user-defined function that produces a table. The semantics and attributes of table functions are declared to the RDBMS 106.

Consider the following query which references a table function:
SELECT A.*
FROM A, TABLE (FOO(A.Z)) AS B The table function FOO takes a value as input and returns a set of rows. If a table function is deterministic, has no side effects, produces values in a node 106 independent way, and has its source code available for execution on all nodes 106, then it is said that it is replicable. A replicable table function can be treated as a replicated table to avoid data movement. Assuming FOO is a replicable function, the join in the above example can be executed locally.

An inferior approach would be to execute the FOO on a single node 106. This would require each node 106 of A sending A.X values to the node 106 executing the table function and then having the results sent back to that node 106. Performance is basically no better than if A were not partitioned at all.

The technique of treating a replicable table function as if it were a replicated table can be used in any of the scenarios where use of replicated tables can promote localization. It can be assumed that there are sufficient table function attributes which allow the query optimizer to determine when a table function is replicable.

Tracking of a General Replication Property

The previous examples show that replication can localize certain query operations. The following example shows that a general notion of replication for both base and intermediate tables is necessary to optimize more complex queries:

SELECT*
FROM C
WHERE EXISTS (SELECT A.X
  FROM A,B
  WERE C.X=A.Y AND A.X>B.X)

Assume that A is replicated across node #0, node #1, and node #2, and that B is replicated across node #1, node #2, and node #3. Assume further that table C is partitioned across node #1 and node #2. Note that the join in the subquery can be performed locally on the intersection of the nodes 106 of A and B, or node #1 and node #2. The result of that join, and hence the subquery result, is replicated on node #1 and node #2. Thus, the partitioning of the subquery satisfies the criteria for local predicate application as described previously. This example illustrates that the optimizer function of the RDBMS 106 must be able to determine the replication of derived tables so that it can effectively exploit it to localize query operations.

Localize Join, Subquery, Set Operations (Union, Intersect, Except) with Multiple Replicated Tables The previous example shows that a join of multiple replicated tables can be performed locally. Likewise, a replicated subquery result can be used in a subquery predicate applied to another replicated stream. The following example shows that the union of two replicated data streams can be carried out locally with a replicated result.

CREATE VIEW V AS
(SELECT*
FROM A
WHERE X>100
UNION
SELECT*
FROM B
WHERE Y<100)
SELECT*
FROM C, V
WHERE C.X=V.X;

Assume now that table A is replicated on node #0, node #1, node #2 and table B is replicated on node #0 and node #2, and that table C is partitioned on node #0 and node #2. One typical execution strategy is to perform the union first and then join the result with table C. Note that the union operation can be carried out locally (again, in parallel with no data exchange) on node #0 and node #2 (the intersection of nodes 106 of tables A and B). The result then satisfies the criteria for a local join with the partitioned table C.

Grounding of Replicated Tables for Proper Query Semantics

In addition to being able to exploit replication to localize operations, the optimizer function of the RDBMS 106 must also be able to maintain the basic semantics of the query when replicated tables are referenced. Consider this simple example:

SELECT*
FROM A

Assume again that table A is replicated. In this case, the optimizer must recognize that only one replica of A should be returned to the user. In the case where A was joined with a partitioned table, this was not a concern since A was naturally grounded by the partitioned table. This means that it was combined with another data stream such that the result is no longer replicated. As shown in the examples above, a join can naturally ground a replicated table. Likewise, a replicated subquery result table is naturally grounded by a partitioned data stream which uses the subquery table to evaluate a predicate.

When a replicated table is not naturally grounded, then the optimizer must ground the replicated table. This is done by choosing not to distribute the QEP which operates on a replicated table to all nodes 106 but rather to only one node 106.

Grounding can be optimized. For example, if the query is executed on a node 106 where A is replicated, then that node 106 can be chosen as the node 106 for grounding thus avoiding data movement back to the coordinator node 106.

Query Optimization Techniques

The optimization techniques of the present invention are best illustrated in the context of generating a query execution plan (QEP), although similar optimization techniques may be performed during other steps or phases of query interpretation and execution. Typically, the RDBMS 106 compiles or interprets the SQL statements of the query in order to create a compiled set of runtime structures known as a Query Execution Plan (QEP). The optimizer function of the RDBMS 106 may transform or optimize the QEP in a manner described in more detail later in this specification. Thereafter, the QEP is executed and the results therefrom provided to the user.

Prior to generating the QEP, a query, and any views it references, is rendered into an internal form called a query graph model (QGM). A QGM represents a semi-procedural dataflow graph of the query. The QGM is basically a high-level, graphical representation of the query.

In the QGM, boxes are used to represent relational operations, while arcs between boxes are used to represent quantifiers, i.e., table references. Each box includes the predicates that it applies, an input or output order specification (if any), a distinct flag, and so on.

The basic boxes include those for SELECT, GROUP BY, and SET operations such as UNION, INTERSECT, EXCEPT. Joins are represented by a SELECT box with two or more input quantifiers, while ORDER BY is represented by a SELECT box with an output order specification. A quantifier may have a requirement that the input can have only one tuple. This quantifier is called a scalar subselect quantifier.

After its construction, the original QGM is transformed into a semantically equivalent but more "efficient" QGM using heuristics such as predicate push-down, view merging, and subquery-to-join transformation. During this phase, the QGM is traversed and a QEP is generated. The QEP specifies the sequence of RDBMS 106 operations used to satisfy the query. Many alternatives QEPs may be considered, and the best alternative is usually selected based upon cost.

Figure 2:
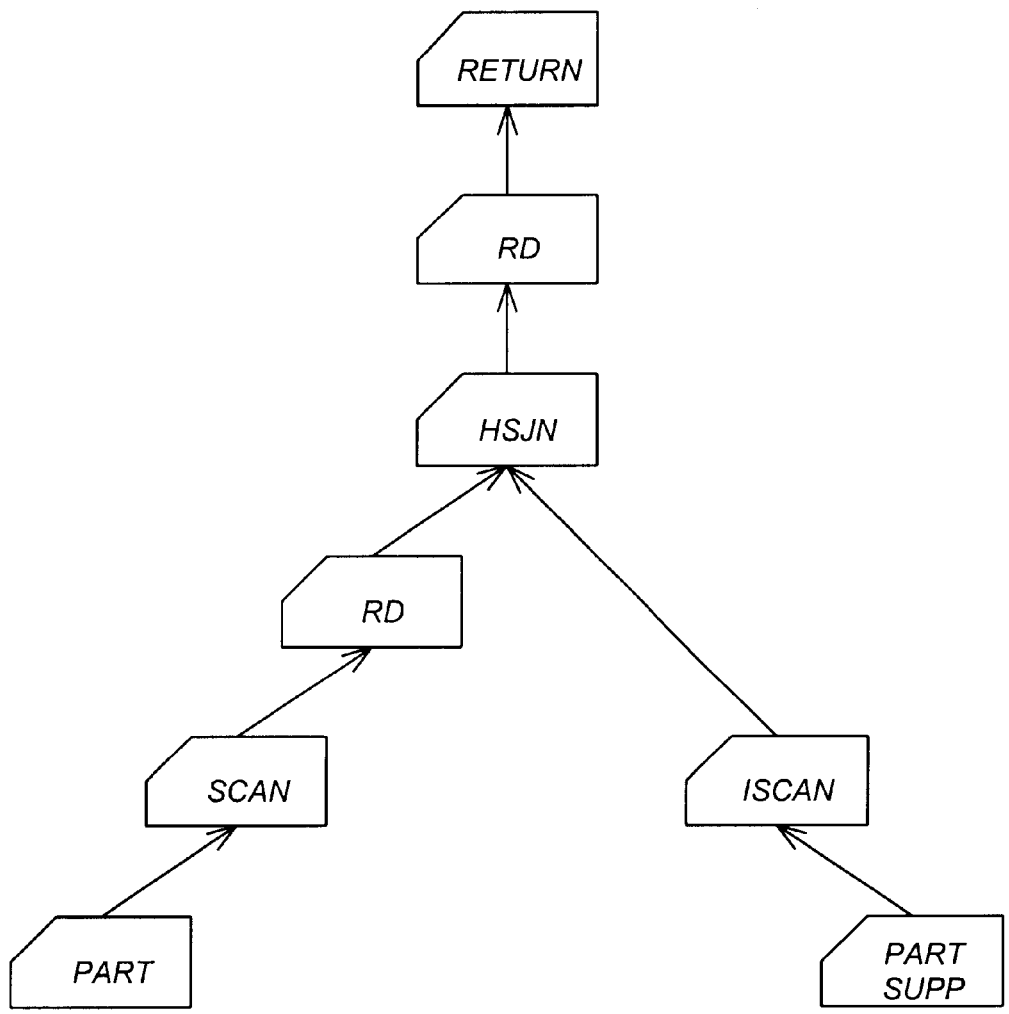
FIG. 2 is a block diagram that illustrates a query execution plan (QEP) according to the preferred embodiment of the present invention.

FIG. 2 illustrates a typical dataflow graph representation of a QEP according to the preferred embodiment of the present invention. In the QEP, RDBMS 106 operators are shown as labeled boxes, such as output (RETURN), hash-join (HSJN), table scan (SCAN), index scan (ISCAN), nested-loops-join (NLJN), group-by (GRBY), distinct (DST), etc. Operators consume one or more tables or tuple streams, and then produce a tuple stream as a result. Each tuple stream has an associated set of properties that summarize important relational characteristics (e.g., tables accessed, predicate applied), physical characteristics (e.g., order, distribution), and estimated characteristics (e.g., cardinality, cost).

The QEP is typically built bottom-up, operator-by-operator, in response to the requirements of the QGM. Each operator in a QEP determines the properties of its output stream. The properties of an operator's output stream are a function of its input stream(s) and the operation being applied by the operator.

The basic parallel semantics of a QEP is defined by the distribution property and an RD (Re-Distribute) operator. In general, the distribution property describes:

the set of nodes 106, or nodeset, that may contain tuples of the stream, the distribution function used for assigning tuples to nodes 106, the distribution key to which the distribution function is applied.

It is said that a distribution property is a partitioned distribution if there are one or more nodes 106 in the nodeset and tuples are assigned to nodes 106 using a deterministic distribution function such as a hash function. It is said that the distribution property is a replicated distribution if each tuple is assigned to all nodes 106 of the nodeset. Again, there can be one or more nodes 106 in the nodeset. This can be represented by providing the nodeset, a special distribution function denoting replication, and no distribution key. The RD operator is used to change the distribution property of the stream in response to distribution requirements of an operator or some part of QGM such as a scalar quantifier.

SNP Query Execution Model

The following example will be used to describe the SNP QEP semantics and execution model:

SELECT*
FROM PART, PARTSUPP
WHERE P_PARTNO=PS_PARTNO AND PS_SUPPNO IN (A,B,C,.)

FIG. 2 illustrates the QEP for the above example. An RD operator divides the QEP into subsections (e.g., subtasks). There are three subsections for the QEP. Subsections are executed using function shipping wherein RDBMS 106 operations are executed where the data resides.

A coordinator node 106 serves as the application interface. It takes application input, manages distribution of subtasks, and returns results to the application. The coordinator node 106 replicates each subsection to the nodes 106 indicated by the distribution property of the subsection.

The distribution property of a subsection is given by the distribution property of the topmost operator of the subsection. In the example above, the distribution properties of the RETURN and HSJN operators give the distribution property of their respective subsections.

The distribution property of database table access operators, such as table scan (SCAN) and index scan (SCAN), describes the static distribution of database 108 relations. Again, the RD operator is used to change the distribution property of the stream dynamically in response to distribution requirements of an operator. Other operators typically just propagate the distribution property; however, this specification will discuss more below about how joins, subqueries, and set operators might change the distribution property to deal with replicated distributions.

To illustrate how distributions and distribution requirements define SNP QEP semantics, assume that table PART has a partitioned distribution based upon distribution key PARTNO and that table PARTSUPP has a partitioned distribution based upon distribution key PS_SUPPNO. A parallel join of two streams with partitioned distributions requires that each is equivalently partitioned with respect to the join attributes. This is not the case in the query above, so an RD operator is added to redistribute table PARTSUPP using the join attribute PS_PARTNO. It is said that an operation, such as HSJN, can be done locally if no redistribution of any of its inputs was necessary to achieve parallel execution. Note that if PARTSUPP had been replicated on a superset of the nodes 106 of PART, then no redistribution would have been needed.

Optimization Techniques

Generating efficient QEPs for parallel execution requires that basic operators understand how to handle input stream with replicated distributions. This requires that basic operators understand when operations can be performed locally and also how to compute the distribution property of the stream produced by the operation. Moreover, if the input stream of an RD operator is replicated, then in order to maintain proper query semantics, the coordinator node 106 must ground the subsection by choosing to distribute it to one node 106 as opposed to all of the nodes 106 of the distribution property of the subsection.

The following describe the optimization techniques necessary for accomplishing the above:

1. A join of a data stream with a replicated distribution property, RS, and a data stream with a partitioned distribution property, PS, can be performed locally if a nodeset of RS is a superset of a nodeset of PS unless the data stream RS is being preserved by an outer join operation (i.e., the data stream with distribution property RS is the left operand of a left join operation, the right operand of a right join operation, or any operand of a full-join operation). The distribution property of the data stream representing the join result is PS.

2. A join of a data stream with a replicated distribution property, RS1, and a data stream with a replicated distribution property, RS2, can be performed locally if a nodeset of RS1 and a nodeset of RS2 intersect on some set of nodes I. The distribution property of the data stream representing the join result is considered replicated on nodeset I.

3. A data stream with a partitioned distribution property, PS, applying a subquery predicate, P, wherein the subquery input data stream to P has a replicated distribution property, RS, can be performed locally if a nodeset of RS is a superset of a nodeset of PS. The distribution property of the data stream representing the result is PS.

4. A data stream with a replicated distribution property, RS1, applying a subquery predicate, P, wherein the subquery input data stream to P has a replicated distribution property, RS2, can be performed locally if locally if a nodeset of RS2 is a superset of a nodeset of RS1. The distribution property of the data stream representing the result is RS1.

5. An aggregation operation, AG(X), (distinct or group by) defined by aggregation attributes X (where X is possibly empty, e.g., select max(x) from t) applied to a data stream with a replicated distribution property, RS, can be performed locally. The distribution property of the aggregation operation AG(X) is RS.

6. A set operation, such as union, intersect, except operations, of n (where n>1) data streams, each with a replicated distribution property, can be performed locally if the intersection of nodes 106 of all data streams, I, is non-empty. The distribution property of the data stream representing the union result is considered replicated on nodeset I.

7. Error checking for a data stream producing the input to a scalar (subquery or join quantifier) subselect can be performed locally if the distribution property of that data stream is replicated.

8. The distribution property of the data stream produced by a replicable table function is considered replicated on nodeset I, where I is a nodeset of some other database table referenced in the query such that: the data stream is used later in the query by a join or subquery operation that has a partitioned distribution on nodeset I. (That is, it will be naturally grounded by I.) If there are multiple possibilities for I, then one table function access strategy for each possibility is built (so that costing of access strategies will decide the best alternative).

9. If a data stream with a replicated distribution property, RS, must be redistributed to one or more nodes 106, N, then the subsection producing the replicated data stream is distributed only to a single node 106 (grounded), N.X, where N.X is a node 106 in a nodeset of RS, and N.X is chosen at query execution by a coordinator node 106 as follows:

N.X is some node 106 in N;

otherwise, N.X is an arbitrary node 106 in N.

Note that some or all nodes 106 in N may be unknown until the query is executed, e.g., N may contain the coordinator node 106.

LOGIC OF THE OPTIMIZATION TECHNIQUES

Figure 3:
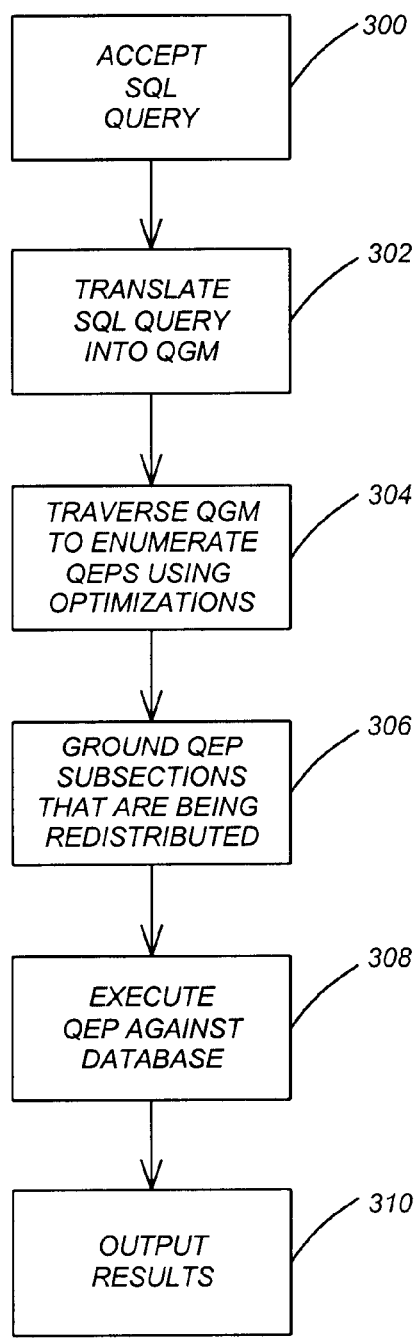
FIG. 3 is a flowchart illustrating a method of optimizing SQL queries according to the preferred embodiment of the present invention.

FIG. 3 is a flowchart illustrating the logic of the optimization techniques described above. The optimization techniques of the preferred embodiment of the present invention are best illustrated in the context of generating a query execution plan (QEP), although similar optimization techniques may be performed during other steps or phases of query interpretation and execution.

Block 300 represents the acceptance of the SQL query (either interactively from the user or extracted from program source code).

Block 302 represents the rendering of the query, and any views it references, into a QGM (query graph model).

Block 304 represents the QGM being traversed from the bottom up, operator-by-operator, to enumerate query execution plans (QEPs) using the optimization techniques described above. According to the preferred embodiment, more than one alternative QEP may be considered, and the best alternative is usually selected based upon cost.

Block 306 represents the subsections of the QEP that are redistributed being grounded.

Block 308 represents the execution of the QEP against the relational database.

Finally, Block 310 represents the results from the execution of the QEP being output.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, many types of database management systems other than relational database management systems could benefit from the present invention.

In summary, the present invention discloses a method, apparatus, and article of manufacture for optimizing database queries. The query is analyzed to determine whether at least a portion of the query can be evaluated using a plurality of parallel operations without data redistribution. If so, then the most efficient query execution plan that uses these parallel operations is generated and executed.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer system, the query being performed by the computer system to retrieve data from a database stored on the computer system, the method comprising the steps of:

(a) determining whether at least a portion of the query can be evaluated using a plurality of parallel operations without data redistribution; and (b) generating a query execution plan that uses the plurality of parallel operations.

2. The method of claim 1, wherein the data is stored in at least one table in the database.

3. The method of claim 2, wherein the tables were previously replicated across a plurality of nodes in the computer system.

4. The method of claim 2, wherein the tables were previously partitioned across a plurality of nodes in the computer system.

5. The method of claim 2, wherein the data was distributed when the table was created.

6. The method of claim 2, wherein the data was redistributed as a result of a dynamic operation.

7. The method of claim 1, wherein the determining step comprises analyzing the query by taking into account a distribution property of at least one data stream for an operation in the query.

8. The method of claim 7, wherein the generating step further comprises:

generating a query execution plan (QEP) for the query, wherein the QEP specifies a sequence of at least one operation used to satisfy the query; and adding an operator to the QEP to dynamically change the distribution property of an input data stream in response to distribution requirements of the operation.

9. The method of claim 8, further comprising grounding the data stream when the operator is added to the QEP to dynamically change the distribution property of the input data stream and the input data stream is replicated.

10. The method of claim 9, further comprising grounding the input data stream by not distributing the QEP to all nodes.

11. The method of claim 10, further comprising distributing the QEP only to a selected node.

12. The method of claim 11, wherein the selected node is in both a nodeset for the grounded input data stream and a nodeset for an output data stream.

13. The method of claim 11, wherein the selected node is only in a nodeset for the grounded input data stream.

14. The method of claim 7, wherein the distribution property describes a set of nodes that may contain tuples of the data stream, a distribution function used for assigning the tuples to nodes, and a distribution key to which the distribution function is applied.

15. The method of claim 7, further comprising determining whether the nodes of the data stream with a replicated distribution property are a superset of the nodes of a data stream with a partitioned or replicated distribution.

16. The method of claim 7, wherein a parallel operation of two or more data streams with partitioned distributions requires that each of the data streams is equivalently partitioned with respect to the parallel operation's attributes.

17. The method of claim 7, wherein a join of a first input data stream with a replicated distribution property, RS, and a second input data stream with a partitioned distribution property, PS, can be performed locally if a nodeset for RS is a superset of a nodeset for PS, unless the first input data stream is being preserved by an outer join operation.

18. The method of claim 17, wherein the distribution property of an output data stream representing a result of the join is PS.

19. The method of claim 7, wherein a join of a first input data stream with a replicated distribution property, RS1, and a second input data stream with a replicated distribution property, RS2, can be performed locally if a nodeset for RS1 and a nodeset for RS2 intersect on a nodeset i.

20. The method of claim 19, wherein the distribution property of an output data stream representing a result of the join is considered replicated on the nodeset i.

21. The method of claim 7, wherein an input data stream with a partitioned distribution property, PS, applying a subquery predicate, P, where the subquery input data stream to P has a replicated distribution property, RS, can be performed locally if a nodeset for RS is a superset of a nodeset for PS.

22. The method of claim 21, wherein the distribution property of an output data stream representing a result of the subquery is PS.

23. The method of claim 7, wherein an input data stream with a replicated distribution property, RS1, applying a subquery predicate, P, where the subquery input data stream to P has a replicated distribution property, RS2, can be performed locally if a nodeset for RS2 is a superset of a nodeset for RS1.

24. The method of claim 23, wherein the distribution property of an output data stream representing a result of the subquery is RS1.

25. The method of claim 7, wherein an aggregation operation, AG(X), defined by at least one aggregation attribute X applied to a data stream with a replicated distribution property, RS, can be performed locally.

26. The method of claim 25, wherein the aggregation operation is selected from a group comprising distinct and group by operations.

27. The method of claim 25, wherein the aggregation attributes are empty.

28. The method of claim 25, wherein the distribution property of an output data stream representing a result of the aggregation operation is RS.

29. The method of claim 7, wherein a set operation of a plurality of data streams, each data stream with a replicated distribution property, can be performed locally if the intersection of nodes of all of the data streams is a non-empty nodeset i.

30. The method of claim 29, wherein the set operation is selected from a group comprising union, intersect, and except operations.

31. The method of claim 29, wherein the distribution property of an output data stream representing a result of the set operation is considered replicated on nodeset i.

32. The method of claim 7, wherein error checking for an input data stream to a scalar subselect can be performed locally if the distribution property of the input data stream is replicated.

33. The method of claim 32, wherein the scalar subselect is selected from a group comprising subquery operations and join operations.

34. The method of claim 7, wherein the distribution property of an output data stream produced by a replicable table function is considered replicated on nodeset I, where I is a nodeset of at least one other table referenced in the query, such that the output data stream is used later in the query by a join or subquery operation that has a distribution on nodeset I.

35. The method of claim 34, further comprising building a table function access strategy for each of a plurality of possibilities for I, so that costing of the access strategies decides a best alternative.

36. The method of claim 1, wherein the parallel operations comprise at least one of the operations selected from a group comprising joins, aggregations, subquery evaluations, set operations, error checking scalar subselects, and table function access.

37. An apparatus for optimizing a query, comprising:
(a) a computer system having a data storage device coupled thereto for storing a database, the query being performed by the computer to retrieve data from the database; and
(b) means, performed by the computer system, for determining whether at least a portion of the query can be evaluated using a plurality of parallel operations without data movement when the data was previously moved; and
(c) means, performed by the computer system, for generating a query execution plan that uses the plurality of parallel operations.

38. The apparatus of claim 37, wherein the data is stored in at least one table in the database.

39. The apparatus of claim 38, wherein the tables were previously replicated across a plurality of nodes in the computer system.

40. The apparatus of claim 38, wherein the tables were previously partitioned across a plurality of nodes in the computer system.

41. The apparatus of claim 38, wherein the data was distributed when the table was created.

42. The apparatus of claim 38, wherein the data was redistributed as a result of a dynamic operation.

43. The apparatus of claim 37, wherein the means for determining comprises means for analyzing the query by taking into account a distribution property of at least one data stream for an operation in the query.

44. The apparatus of claim 43, wherein the means for generating further comprises:
means for generating a query execution plan (QEP) for the query, wherein the QEP specifies a sequence of at least one operation used to satisfy the query; and
means for adding an operator to the QEP to dynamically change the distribution property of an input data stream in response to distribution requirements of the operation.

45. The apparatus of claim 44, further comprising means for grounding the data stream when the operator is added to the QEP to dynamically change the distribution property of the input data stream and the input data stream is replicated.

46. The apparatus of claim 45, further comprising means for grounding the input data stream by not distributing the QEP to all nodes.

47. The apparatus of claim 46, further comprising means for distributing the QEP only to a selected node.

48. The apparatus of claim 47, wherein the selected node is in both a nodeset for the grounded input data stream and a nodeset for an output data stream.

49. The apparatus of claim 47, wherein the selected node is only in a nodeset for the grounded input data stream.

50. The apparatus of claim 43, wherein the distribution property describes a set of nodes that may contain tuples of the data stream, a distribution function used for assigning the tuples to nodes, and a distribution key to which the distribution function is applied.

51. The apparatus of claim 43, further comprising means for determining whether the nodes of the data stream with a replicated distribution property are a superset of the nodes of a data stream with a partitioned or replicated distribution.

52. The apparatus of claim 43, wherein a parallel operation of two or more data streams with partitioned distributions requires that each of the data streams is equivalently partitioned with respect to the parallel operation's attributes.

53. The apparatus of claim 43, wherein a join of a first input data stream with a replicated distribution property, RS, and a second input data stream with a partitioned distribution property, PS, can be performed locally if a nodeset for RS is a superset of a nodeset for PS, unless the first input data stream is being preserved by an outer join operation.

54. The apparatus of claim 53, wherein the distribution property of an output data stream representing a result of the join is PS.

55. The apparatus of claim 43, wherein a join of a first input data stream with a replicated distribution property, RS1, and a second input data stream with a replicated distribution property, RS2, can be performed locally if a nodeset for RS1 and a nodeset for RS2 intersect on a nodeset i.

56. The apparatus of claim 55, wherein the distribution property of an output data stream representing a result of the join is considered replicated on the nodeset i.

57. The apparatus of claim 43, wherein an input data stream with a partitioned distribution property, PS, applying a subquery predicate, P, where the subquery input data stream to P has a replicated distribution property, RS, can be performed locally if a nodeset for RS is a superset of a nodeset for PS.

58. The apparatus of claim 57, wherein the distribution property of an output data stream representing a result of the subquery is PS.

59. The apparatus of claim 43, wherein an input data stream with a replicated distribution property, RS1, applying a subquery predicate, P, where the subquery input data stream to P has a replicated distribution property, RS2, can be performed locally if a nodeset for RS2 is a superset of a nodeset for RS1.

60. The apparatus of claim 59, wherein the distribution property of an output data stream representing a result of the subquery is RS1.

61. The apparatus of claim 43, wherein an aggregation operation, AG(X), defined by at least one aggregation attribute X applied to a data stream with a replicated distribution property, RS, can be performed locally.

62. The apparatus of claim 61, wherein the aggregation operation is selected from a group comprising distinct and group by operations.

63. The apparatus of claim 61, wherein the aggregation attributes are empty.

64. The apparatus of claim 61, wherein the distribution property of an output data stream representing a result of the aggregation operation is RS.

65. The apparatus of claim 43, wherein a set operation of a plurality of data streams, each data stream with a replicated distribution property, can be performed locally if the intersection of nodes of all of the data streams is a non-empty nodeset i.

66. The apparatus of claim 65, wherein the set operation is selected from a group comprising union, intersect, and except operations.

67. The apparatus of claim 65, wherein the distribution property of an output data stream representing a result of the set operation is considered replicated on nodeset i.

68. The apparatus of claim 43, wherein error checking for an input data stream to a scalar subselect can be performed locally if the distribution property of the input data stream is replicated.

69. The apparatus of claim 68, wherein the scalar subselect is selected from a group comprising subquery operations and join operations.

70. The apparatus of claim 43, wherein the distribution property of an output data stream produced by a replicable table function is considered replicated on nodeset I, where I is a nodeset of at least one other table referenced in the query, such that the output data stream is used later in the query by a join or subquery operation that has a distribution on nodeset I.

71. The apparatus of claim 70, further comprising means for building a table function access strategy for each of a plurality of possibilities for I, so that costing of the access strategies decides a best alternative.

72. The apparatus of claim 37, wherein the parallel operations comprise at least one of the operations selected from a group comprising joins, aggregations, subquery evaluations, set operations, error checking of scalar subselects, and table function access.

73. An article of manufacture embodying logic for performing method steps for optimizing a query, the query being performed by a computer system to retrieve data from a database stored in a data storage device coupled to the computer system, the method comprising the steps of:

(a) determining whether at least a portion of the query can be evaluated using a plurality of parallel operations without data movement when the data was previously moved; and (b) generating a query execution plan that uses the plurality of parallel operations.

74. The method of claim 73, wherein the data is stored in at least one table in the database.

75. The method of claim 74, wherein the tables were previously replicated across a plurality of nodes in the computer system.

76. The method of claim 74, wherein the tables were previously partitioned across a plurality of nodes in the computer system.

77. The method of claim 74, wherein the data was distributed when the table was created.

78. The method of claim 74, wherein the data was redistributed as a result of a dynamic operation.

79. The method of claim 73, wherein the determining step comprises analyzing the query by taking into account a distribution property of at least one data stream for an operation in the query.

80. The method of claim 79, wherein the generating step further comprises:

generating a query execution plan (QEP) for the query, wherein the QEP specifies a sequence of at least one operation used to satisfy the query; and adding an operator to the QEP to dynamically change the distribution property of an input data stream in response to distribution requirements of the operation.

81. The method of claim 80, further comprising grounding the input data stream when the operator is added to the QEP to dynamically change the distribution property of the input data stream and the input data stream is replicated.

82. The method of claim 81, further comprising grounding the input data stream by not distributing the QEP to all nodes.

83. The method of claim 82, further comprising distributing the QEP only to a selected node.

84. The method of claim 83, wherein the selected node is in both a nodeset for the grounded input data stream and a nodeset for an output data stream.

85. The method of claim 83, wherein the selected node is only in a nodeset for the grounded input data stream.

86. The method of claim 79, wherein the distribution property describes a set of nodes that may contain tuples of the data stream, a distribution function used for assigning the tuples to nodes, and a distribution key to which the distribution function is applied.

87. The method of claim 79, further comprising determining whether the nodes of the data stream with a replicated distribution property are a superset of the nodes of a data stream with a partitioned or replicated distribution.

88. The method of claim 79, wherein a parallel operation of two or more data streams with partitioned distributions requires that each of the data streams is equivalently partitioned with respect to the parallel operation's attributes.

89. The method of claim 79, wherein a join of a first input data stream with a replicated distribution property, RS, and a second input data stream with a partitioned distribution property, PS, can be performed locally if a nodeset for RS is a superset of a nodeset for PS, unless the first input data stream is being preserved by an outer join operation.

90. The method of claim 89, wherein the distribution property of an output data stream representing a result of the join is PS.

91. The method of claim 79, wherein a join of a first input data stream with a replicated distribution property, RS1, and a second input data stream with a replicated distribution property, RS2, can be performed locally if a nodeset for RS1 and a nodeset for RS2 intersect on a nodeset i.

92. The method of claim 91, wherein the distribution property of an output data stream representing a result of the join is considered replicated on the nodeset i.

93. The method of claim 79, wherein an input data stream with a partitioned distribution property, PS, applying a subquery predicate, P, where the subquery input data stream to P has a replicated distribution property, RS, can be performed locally if a nodeset for RS is a superset of a nodeset for PS.

94. The method of claim 93, wherein the distribution property of an output data stream representing a result of the subquery is PS.

95. The method of claim 79, wherein an input data stream with a replicated distribution property, RS1, applying a subquery predicate, P, where the subquery input data stream to P has a replicated distribution property, RS2, can be performed locally if a nodeset for RS2 is a superset of a nodeset for RS1.

96. The method of claim 95, wherein the distribution property of an output data stream representing a result of the subquery is RS1.

97. The method of claim 79, wherein an aggregation operation, AG(X), defined by at least one aggregation attribute X applied to a data stream with a replicated distribution property, RS, can be performed locally.

98. The method of claim 97, wherein the aggregation operation is selected from a group comprising distinct and group by operations.

99. The method of claim 97, wherein the aggregation attributes are empty.

100. The method of claim 97, wherein the distribution property of an output data stream representing a result of the aggregation operation is RS.

101. The method of claim 79, wherein a set operation of a plurality of data streams, each data stream with a replicated distribution property, can be performed locally if the intersection of nodes of all of the data streams is a non-empty nodeset i.

102. The method of claim 101, wherein the set operation is selected from a group comprising union, intersect, and except operations.

103. The method of claim 101, wherein the distribution property of an output data stream representing a result of the set operation is considered replicated on nodeset i.

104. The method of claim 79, wherein error checking for an input data stream to a scalar subselect can be performed locally if the distribution property of the input data stream is replicated.

105. The method of claim 104, wherein the scalar subselect is selected from a group comprising subquery operations and join operations.

106. The method of claim 79, wherein the distribution property of an output data stream produced by a replicable table function is considered replicated on nodeset I, where I is a nodeset of at least one other table referenced in the query, such that the output data stream is used later in the query by a join or subquery operation that has a distribution on nodeset I.

107. The method of claim 106, further comprising building a table function access strategy for each of a plurality of possibilities for I, so that costing of the access strategies decides a best alternative.

108. The method of claim 73, wherein the parallel operations comprise at least one of the operations selected from a group comprising joins, aggregations, subquery evaluations, set operations, error checking scalar subselects, and table function access.

* * * * *